Aug. 26, 1930.  J. BERGREN  1,773,804
PAIL FOR HOLDING MINNOWS, FROGS, AND OTHER LIVE BAIT
Filed Feb. 6, 1929
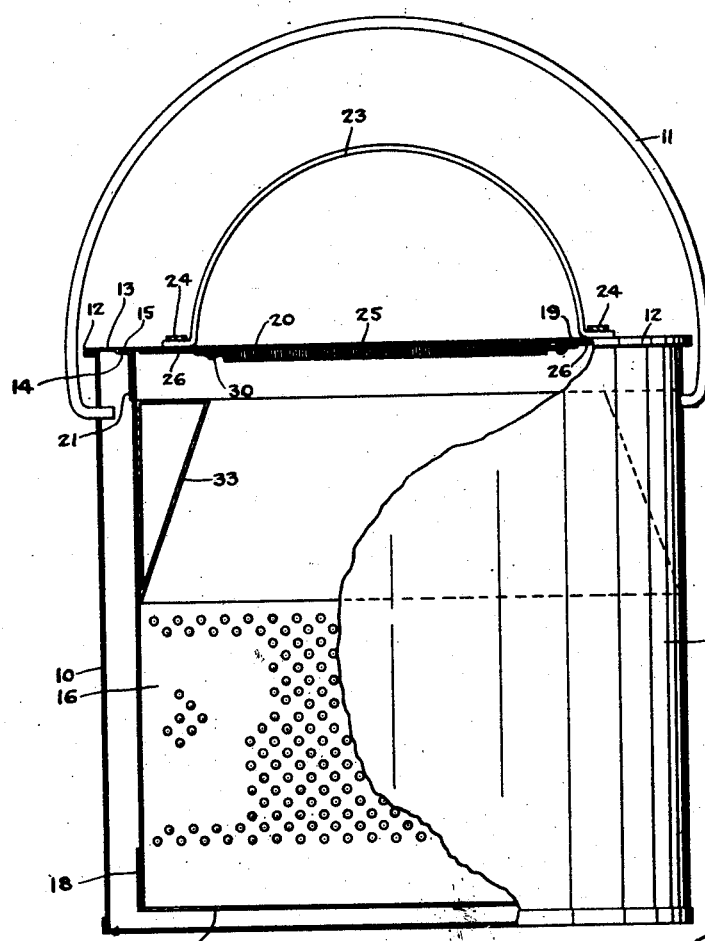
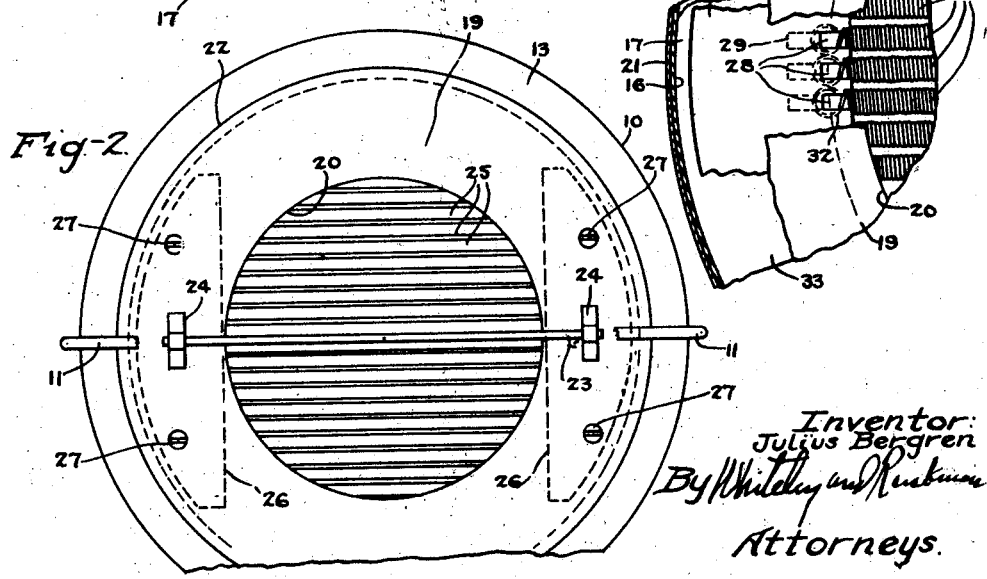
Inventor:
Julius Bergren
Attorneys.

Patented Aug. 26, 1930

1,773,804

UNITED STATES PATENT OFFICE

JULIUS BERGREN, OF MINNEAPOLIS, MINNESOTA, ASSIGNOR OF ONE-THIRD TO ISAAC E. BURT, OF MINNEAPOLIS, MINNESOTA

PAIL FOR HOLDING MINNOWS, FROGS, AND OTHER LIVE BAIT

Application filed February 6, 1929. Serial No. 337,808.

My invention relates to pails for holding minnows, frogs and other live bait. It has for its object to provide a double set of containers, the outer one imperforate and the inner one perforate, which are held together so as to be readily separable, and to provide means for permitting the hand to be inserted into the perforate container while maintaining the same closed against escape of the bait. It is a principal object of my invention to so construct the containers in order that the inner container may be removed from the outer container and immersed in the water of lake, stream or river for the purpose of giving the bait fresh water and better conditions to keep it alive. It is also an object of my invention to employ the inner container as a lure by immersing it in deep water in the path of large fish who are attracted by the school of small live fish or bait in the container and may thereby be brought near to the fishing lures and more easily caught.

The full objects and advantages of my invention will appear in connection with the detailed description thereof, and the novel features of the invention are particularly pointed out in the appended claims.

In the drawings illustrating an application of my invention, Fig. 1 is an elevational view partly in section of an apparatus embodying my invention. Fig. 2 is a partial plan viewed from above with some parts broken away. Fig. 3 is an enlarged sectional plan of a portion of the periphery of the inner container with parts thereof broken away.

An outer container 10 may be an ordinary pail of galvanized iron or other rust-proof metal provided with a bail for carrying the same. The pail will, however, be formed with a re-enforcing flange 12 which is turned horizontally inward to form an annular horizontal inturned lip 13, this lip 13 being provided with a countersunk groove seat as indicated at 14 which will be of the proper thickness to receive a horizontal annular flange 15 on the top of the inner container as hereinafter described. The inner container comprises cylindrical walls 16 with a bottom 17 secured thereto by means of an upturned annular flange 18 and an annular top plate 19 provided with a central circular aperture 20. The top plate 19 extends beyond the limits of the perforate cylindrical shell 16 and is turned back upon itself and upon said shell as indicated at 21, thus forming the flange 15 heretofore referred to. This construction and arrangement is such that when the inner container is seated within the outer container, the flange 15 will fall within the groove 14 so as to make a level joint as indicated at 22 in Fig. 2. A bail 23 is secured to the top of the annular cover member 19 by means of staples 24 fast on said top.

The circular opening in the top member 19 is sufficiently large to admit either or both hands. It is a feature of my invention to provide means closing this top against the escape of the live bait therein and at the same time such as will permit the introduction of the hands. The closure is provided by a multiplicity of coiled springs 25 extending horizontally across the circular opening 20. A convenient means for holding these springs in a normally taut condition is by means of plates 26 indicated in dotted lines on Fig. 2 which are secured on the underside of the annular top 19 by means of screws 27 preferably countersunk in the top wall of annular plate 19. As shown in Fig. 3, a series of notches 28 are cut out of the edge of plate 26 and the material is turned back to form hooks as indicated at 29 in dotted lines on Fig. 3 and at 30 in Fig. 1. The securing rings 32 of the springs 25 are carried over the hooks 30 and in that manner the springs are held stretched across the opening 20, the assembling being effected by fastening the plates 26 in position by means of the screws 27 after the springs have been assembled on the plates.

The advantages and means of operation of my live bait pail will be apparent. When carrying bait to and from fishing places or when used where it is inconvenient or impractical to immerse it in live water, the two containers will be kept assembled as shown in Fig. 1, the water being carried of course in both containers. When, however, it is desirable and practicable to put the bait in live water, it is only necessary to withdraw the inner container from the outer container and drop it or suspend it in whatever live water may be desired. For the purpose of holding the inner container in the live water at the surface thereof, as for example, on the lake shore or adjacent a boat while fishing it is preferably provided with an annular airtight float construction indicated at 33. This will be of such size as to counterbalance the weight of the container and hold it at the level of the water.

It is often desirable to keep the live bait while fishing operations are going on in relatively deep water. It has the double advantage of maintaining the bait in relatively cool water and also acting as a lure to draw fish to the spot. It has been found that when minnows, particularly of the shiner type, are so immersed in deep water they will appear through the perforations in the pail to be swimming in a school, and this will have the effect of attracting large fish. These fish when swimming about will see the bait on the hooks of the fisherman and more effective fishing will result. If the inner container is made without the float 33 secured to the inside of the cylindrical perforated shell 16, it will drop to the desired depth of its own weight. If the float is employed and it is desired to sink the bait container a weight of lead or other metal may be inserted in the container to cause it to sink. The live bait in the container cannot escape even when the container is immersed in deep water. At the same time, the closure formed with a series of springs makes it a simple matter to insert one or both hands through the circular opening for the purpose of withdrawing bait.

I claim:

1. A live bait receptacle comprising a perforate container, a cover for the container formed with an aperture therethrough and a multiplicity of coiled springs extending across said aperture so as to block egress of bait from the container and permit entrance of the hand for removing the bait.

2. A live bait receptacle comprising a perforate container, a cover for the container formed of a sheet metal plate having an aperture therethrough, a plate secured to said cover plate on each side of said aperture and each provided with a multiplicity of hooks and a multiplicity of elastic members secured at their ends to said hooks so as to extend across said aperture and block egress of live bait from the said container and permit entrance of the hand for removing the bait.

3. A live bait receptacle comprising a perforate container, a cover for the container formed of a sheet metal plate having an aperture therethrough, a plate secured to said cover plate on each side of said aperture and each provided with a multiplicity of hooks, and a multiplicity of coiled springs having fastening extensions secured to said hooks on each side of the aperture respectively so as to hold the springs taut and extending across said aperture to block egress of live bait from the said container and permit entrance of the hand for removing the bait.

In testimony whereof I hereunto affix my signature.

JULIUS BERGREN.